(12) United States Patent
Creta et al.

(10) Patent No.: US 7,676,603 B2
(45) Date of Patent: Mar. 9, 2010

(54) WRITE COMBINING PROTOCOL BETWEEN PROCESSORS AND CHIPSETS

(75) Inventors: Kenneth C. Creta, Gig Harbor, WA (US); Aaron T. Spink, San Francisco, CA (US); Lance E. Hacking, Austin, TX (US); Sridhar Muthrasanallur, Tumwater, WA (US); Jasmin Ajanovic, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 10/828,872

(22) Filed: Apr. 20, 2004

(65) Prior Publication Data

US 2005/0235067 A1  Oct. 20, 2005

(51) Int. Cl.
*G06F 3/00* (2006.01)
(52) U.S. Cl. .................. 710/5; 710/8; 710/52; 711/169
(58) Field of Classification Search ..................... 710/5, 710/8, 52
See application file for complete search history.

(56) References Cited

U.S. PATENT DOCUMENTS

| | | | |
|---|---|---|---|
| 6,101,568 A * | 8/2000 | Richardson | 710/310 |
| 6,223,641 B1 * | 5/2001 | Kang | 83/861 |
| 6,233,641 B1 * | 5/2001 | Graham et al. | 710/316 |
| 6,400,730 B1 * | 6/2002 | Latif et al. | 370/466 |
| 6,457,084 B1 * | 9/2002 | Gulick et al. | 710/305 |
| 6,553,446 B1 * | 4/2003 | Miller | 710/307 |
| 6,601,118 B1 * | 7/2003 | Rooney | 710/56 |
| 6,629,166 B1 * | 9/2003 | Grun | 710/36 |
| 6,683,883 B1 * | 1/2004 | Czeiger et al. | 370/401 |
| 6,748,496 B1 * | 6/2004 | Scarpino | 711/137 |
| 6,813,653 B2 * | 11/2004 | Avery | 710/22 |
| 6,877,049 B1 * | 4/2005 | Myers | 710/56 |
| 6,880,062 B1 * | 4/2005 | Ibrahim et al. | 711/202 |
| 6,950,438 B1 * | 9/2005 | Owen et al. | 370/409 |
| 7,356,608 B2 * | 4/2008 | Rimmer | 709/238 |
| 2002/0087801 A1 * | 7/2002 | Bogin et al. | 711/137 |
| 2002/0174229 A1 * | 11/2002 | Owen et al. | 709/227 |
| 2003/0023666 A1 * | 1/2003 | Conway et al. | 709/201 |
| 2003/0185154 A1 * | 10/2003 | Mullendore et al. | 370/230 |
| 2004/0015503 A1 * | 1/2004 | Smith et al. | 707/100 |
| 2004/0019729 A1 * | 1/2004 | Kelley et al. | 710/306 |
| 2004/0193757 A1 * | 9/2004 | Creta et al. | 710/33 |
| 2005/0005044 A1 * | 1/2005 | Liu et al. | 710/74 |
| 2005/0066225 A1 * | 3/2005 | Rowan et al. | 714/5 |
| 2005/0071534 A1 * | 3/2005 | Kwatra | 710/315 |

* cited by examiner

*Primary Examiner*—Alford W Kindred
*Assistant Examiner*—Ernest Unelus
(74) *Attorney, Agent, or Firm*—David P. McAbee

(57) ABSTRACT

Systems and methods of processing write transactions provide for combining write transactions on an input/output (I/O) hub according to a protocol between the I/O hub and a processor. Data associated with the write transactions can be flushed to an I/O device without the need for proprietary software and specialized registers within the I/O device.

28 Claims, 4 Drawing Sheets

US 7,676,603 B2

WRITE COMBINING PROTOCOL BETWEEN PROCESSORS AND CHIPSETS

CROSS-REFERENCE TO RELATED APPLICATIONS

The present application is related to U.S. patent application Ser. No. 10/402,125, filed on Mar. 28, 2003.

BACKGROUND

1. Technical Field

One or more embodiments of the present invention generally relate to the processing of computer system transactions. In particular, certain embodiments relate to protocols for combining write transactions.

2. Discussion

As consumer demand for faster processing and enhanced functionality continues to increase, the importance of computing efficiency and performance also increases. Modern day processors use cache memory as one technique to make the processing of data more efficient, where data in the cache memory is allocated by the operating system (OS) one page at a time and each page contains a number of cache entries. Each cache entry usually holds a certain number of words, known as a "cache line" or "cache block" and an entire line is typically read and cached at once in order to achieve optimum "burst" performance. Unfortunately, processors running certain applications such as graphics applications are most often required to implement pixel writes, which tend to be 8-bit, 16-bit or 32-bit quantities rather than the full cache lines (e.g., 64-byte) necessary to provide optimum burst performance.

As a result, a conventional processor may not be able to achieve the desired level of performance in some cases. To address this problem, more recent computer architectures have been designed to automatically combine smaller, or partial, writes into larger cache line writes. This approach is referred to as processor "write-combining". Processor write-combining is implemented by tagging each page in memory with a write combining (WC) attribute, which indicates whether partial writes from the page can be combined, and buffering the writes on the processor until a full cache line is obtained. The combined writes are typically then sent to their intended destination by way of a chipset input/output (I/O) hub, where the intended destination might be a memory mapped input/output (MMIO) space of an input/output (I/O) device. The I/O hub serves as a bridge between the processor/processor bus and an I/O interface (e.g., bus) that connects to the I/O device containing the MMIO space.

It has been determined, however, that a cache line is not typically an optimal data length for certain I/O interfaces. For example, one 64-byte cache line is roughly 69% efficient for write transactions (or "writes") on peripheral components interconnect-express (PCI-Express) buses. While recent approaches have been developed to provide for chipset write combining in order to make writes from the chipset more efficient from the perspective of the I/O interface, a number of difficulties remain.

One difficulty results from the fact that posting memory writes to an intermediate agent such as a chipset I/O hub can cause problems with regard to unordered interfaces. The use of unordered interfaces essentially leads to multiple paths for data traveling from a source to a destination. Since some routes may be shorter than others, the "multipath" effect can lead to the execution of instructions out of their intended order. For example, a posted memory write transaction typically completes at the processor before it actually completes at the MMIO space. Posting enables the processor to proceed with the next operation while the posted write transaction is still making its way through the system to its ultimate destination. Because the processor proceeds before the write actually reaches its destination, other events that the operating system (OS) expects to occur after the write (e.g., a read from the same destination) may pass the write. The result can be unexpected behavior of the computer system.

To address this concern, various consumer/producer ordering rules have been developed so that hardware can maintain the ability to use posting to optimize performance without negatively affecting software operation. Indeed, many ordering rules specifically focus on the flushing of posting buffers. One particular chipset write-combining technique relies upon an I/O software driver to enforce ordering rules by notifying the chipset when it is necessary to flush the buffer contents to the I/O device. Unfortunately, the software driver is a proprietary solution that cannot be used by off-the-shelf OS software and application software.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
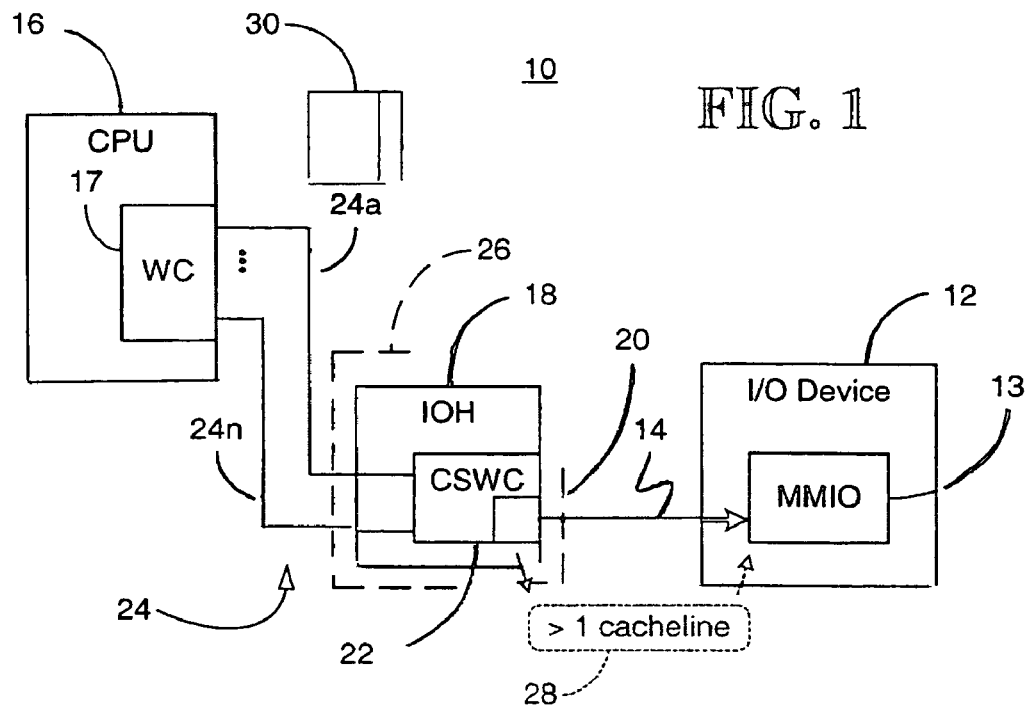
FIG. 1 is a diagram of an example of a computer system according to one embodiment of the invention.

FIG. 1 shows a computer system 10 in which performance benefits associated with chipset write combining can be obtained without the need for proprietary driver software to enforce or modify transaction ordering rules. The computer system 10 includes an input/output (I/O) device 12, an I/O interface 14, a central processing unit (CPU) or processor 16 and a chipset 26 having an I/O hub 18 operatively coupled to the I/O interface 14 and the processor 16. The I/O hub 18 could be a memory controller hub (MCH) that functions as a "north bridge" to the I/O interface 14, an I/O controller hub (ICH) that functions as a "south bridge" to the I/O interface 14, or any other type of hub that provides communication to a device having write combinable memory space. Examples of I/O interfaces include, but are not limited to, peripheral components interconnect-express (PCI-Express) buses and extended industry-standard architecture (EISA) buses. One example of an I/O device is an Ethernet controller, which provides connectivity to an Ethernet network (not shown), although other types of I/O devices may also be used without parting from the spirit and scope of the illustrated embodiments. The I/O device 12 has memory mapped input/output (MMIO) space 13 that includes write combinable memory space.

The illustrated processor 16 has a write combining module 17 capable of automatically combining partial writes into cache line writes in order to achieve optimum burst performance from the perspective of the processor 16. Specifically, processor write-combining is implemented by tagging each page in memory with a write combining (WC) attribute, which indicates whether partial writes from the page in question can be combined. Write combinable writes are typically buffered until a full cache line is obtained, although the processor 16 does not have to actually combine the writes in order for the I/O hub 18 to implement write combining. If the writes have the WC attribute, the write transactions 24 (24a-24c) are sent out as write combinable writes. The write transactions 24 therefore instruct (or command) the I/O hub 18 to consider the writes for chipset write combining.

The interface between the processor 16 and the I/O hub 18 may represent a portion of a point-to-point fabric. In such and embodiment, a point-to-point network interconnect is coupled to the processor 16, the I/O hub 18 and various other nodes in the system 10. In the point-to-point fabric topology, each node has a direct link to other nodes in the system. The network interconnect can also have a layered communication protocol in which write transactions are transferred between nodes in packets at a protocol layer. Packets are data structures having a header and payload; where, the header includes "routing information" such as the source address and/or destination address of the packet; and/or, a connection identifier that identifies a connection that effectively exists in the network interconnect to transport the packet. Other layers such as transport, routing, link and physical layers can reside beneath the protocol layer in the hierarchy. Table I summarizes one approach to implementing the layered communication protocol.

TABLE I

| Layer | Description |
| --- | --- |
| Protocol | Higher level communication protocol between nodes such as power management, cache coherence, ordering, peer to peer I/O, interrupt delivery, etc. |
| Transport | End-to-end reliable transmission between two agents |
| Routing | Flexible and distributed way to route packets from a source to a destination |
| Link | Reliable data transfer and flow control between two directly connected agents & virtualization of the physical channel |
| Physical | Electrical transfer of information between two directly connected agents. |

The transport and routing layers may be needed for certain platform options only. In desktop/mobile and dual processor systems, for example, the functionality of the routing layer can be embedded in the link layer. Simply put, layers may be added or removed from the protocol without parting from the spirit and scope of the illustrated embodiments. Furthermore, other topologies such as ring topologies can be used depending upon scalability and other implementation concerns.

The I/O hub 18 has a buffer 20 and a chipset write combining (CSWC) module 22, where the write combining module 22 receives the write transactions 24 from the processor 16 and stores data 28 associated with the write transactions 24 to the buffer 20. The write combining module 22 also flushes the data 28 to the I/O device 12 according to a protocol between the I/O hub 18 and the processor 16. Thus, proprietary driver software and specialized writes to internal registers of the I/O device 12 are not necessary for proper consumer/producer transaction ordering. As illustrated, the amount of data 28 can also be greater than one cache line in order to maximize performance from the perspective of the I/O interface 14.

Figure 3:
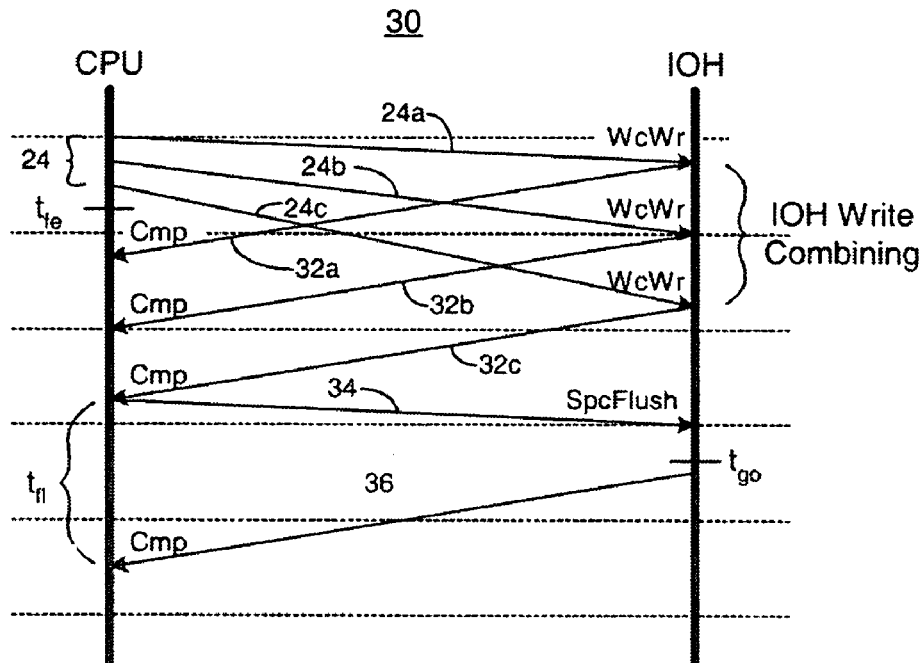
FIG. 3 is a protocol diagram of an example of a write combining protocol according to one embodiment of the invention.

Turning now to FIG. 3, one approach to implementing the protocol between the I/O hub and the processor is shown in protocol diagram 30. In the illustrated example, the processor combines write combinable write (WcWr) transactions 24 (24a-24c) and sends them toward the I/O hub, where the I/O hub buffers the data associated with the write transactions 24. A flushing event occurs at time $t_{fe}$, causing the processor to discontinue the combining of write transactions. Flushing events can include, but are not limited to, the use of ordering fences, encountering implicit locked instructions and encountering interrupts.

Meanwhile, the illustrated I/O hub sends a write completion signal 32a-32c back to the processor for each of the write transactions 24, where each write completion signal 32a-32c verifies buffering of the corresponding write transaction. Upon receiving the final write completion signal 32c (i.e., the write completion signal corresponding to the last write combinable write issued to the I/O hub), the processor sends a flush signal (special flush, or "SpcFlush") 34 to the I/O hub. When the flush signal 34 is received by the I/O hub, the buffered data is flushed to the I/O device and a flush completion signal 36 is returned to the processor. Therefore, the write completion signals 32a-32c are sent before the data is flushed to the I/O device and the write transactions 24 become globally observable after flushing at time $t_{go}$. During the time period $t_{fl}$ between sending the flush signal 34 and receiving the flush completion signal 36, the processor refrains from issuing write combinable writes to the same memory region in the I/O device. The protocol illustrated in diagram 30 therefore defines an explicit signaling protocol between the processor and the 10 hub, where the flush signal 34 specifically instructs the I/O hub to flush data.

Figure 4:
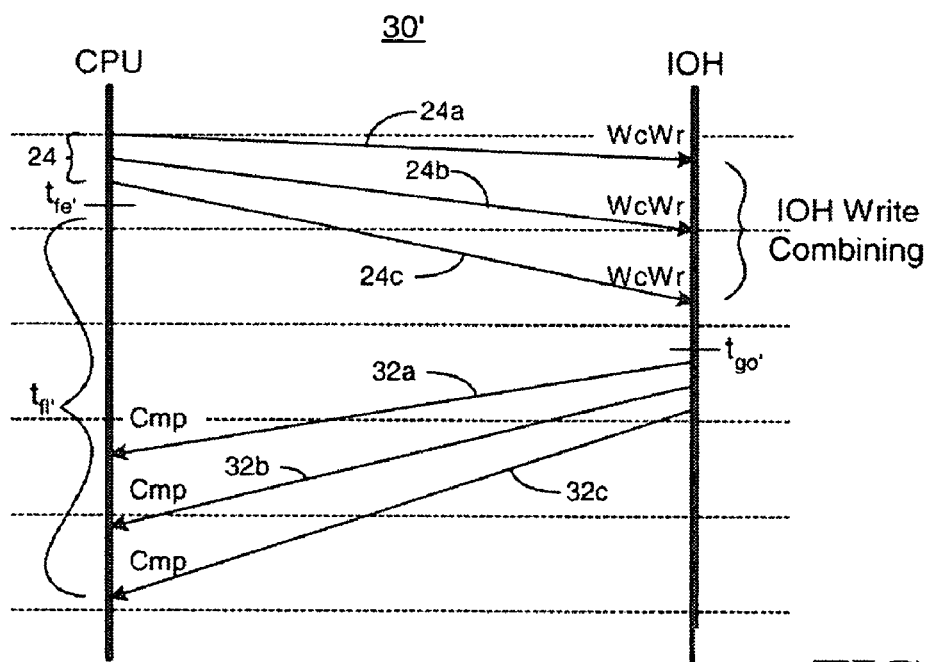
FIG. 4 is a protocol diagram of an example of a write combining protocol according to an alternative embodiment of the invention.

FIG. 4 shows an alternative approach to implementing the protocol between the I/O hub and the processor in diagram 30'. In this example, the processor combines write combinable write transactions 24 and sends them toward the I/O hub, and the I/O hub buffers the data as described above. A flushing event occurs at time $t_{fe}$ and the processor terminates the write combining in response to the flushing event. Thus, the processor pipelines write combinable writes until a flushing event occurs. When the I/O hub determines that a latency condition exists due to, for example, the lack of incoming write combinable writes, the I/O hub flushes the data to the I/O device. Detecting the latency condition can also include determining whether the I/O interface to the I/O device is in an idle state.

Once the data is flushed to the I/O device the I/O hub sends write completion signals 32a-32c back to the processor to verify flushing of each write transaction. Therefore, in the illustrated example the write transactions 24 become globally observable at time $t_{go}'$ and the write completion signals 32a-32c are sent after the data is flushed to the I/O device. During the time period $t_{fl}'$ between detection of the flushing event and receiving the final write completion signal, the processor refrains from issuing order-dependent transactions. Simply put, the processor waits for all previous write combinable writes to complete before proceeding with the next order-dependent event. The protocol illustrated in diagram 30' therefore represents an implicit timing protocol between the processor and the I/O hub.

Figures 5, 6:
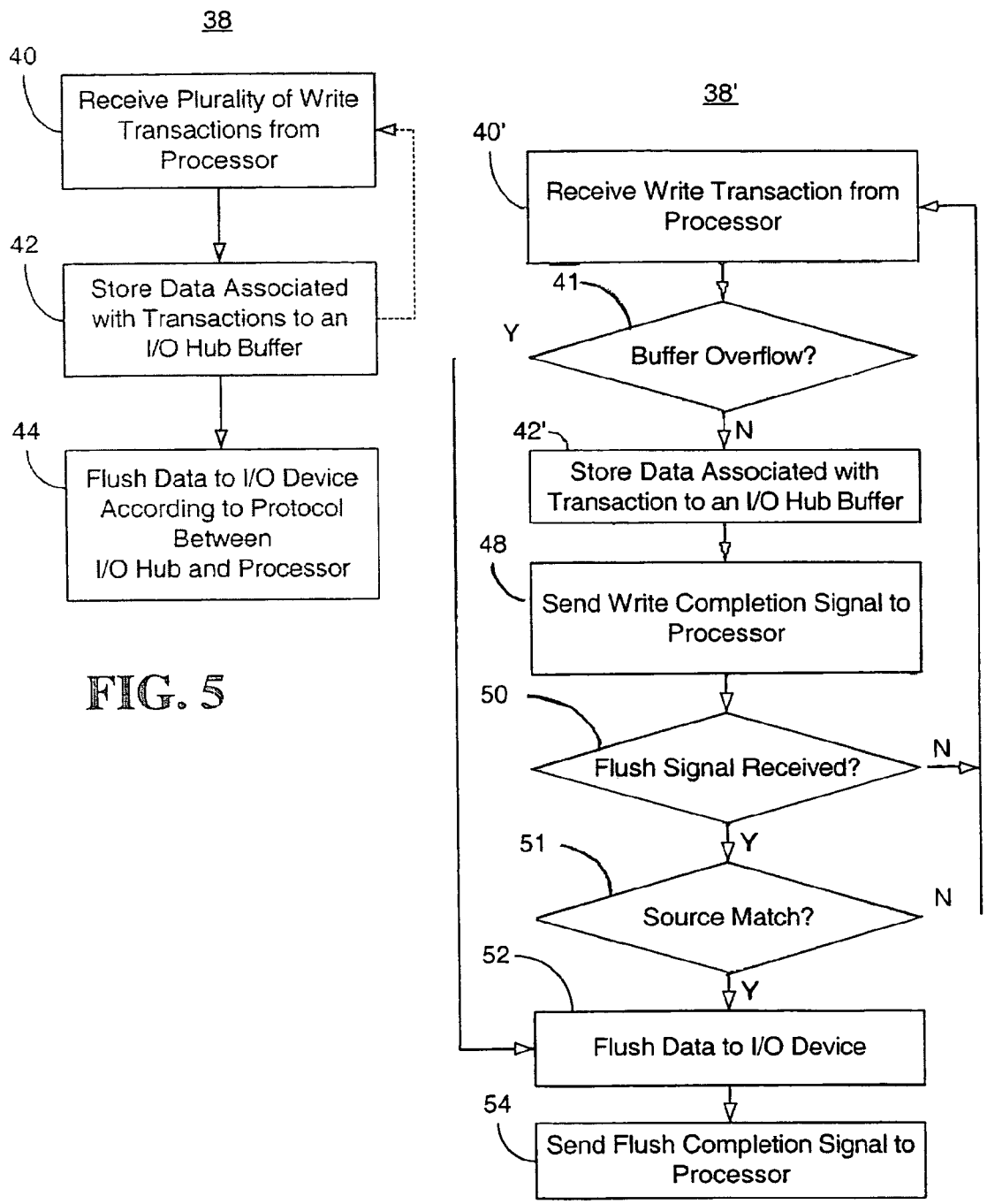
FIG. 5 is a flowchart of an example of method of processing write transactions according to one embodiment of the invention.
FIG. 6 is a flowchart of an example of a process of flushing data to an I/O device, according to one embodiment of the invention.

Turning now to FIG. 5, a method 38 of processing write transactions is shown. The method 38 can be implemented in a write combining module of an I/O hub using any acceptable hardware and/or software programming technique. For example, the method 38 can be embodied as a set of instructions to be stored in a machine readable medium such as read only memory (ROM), programmable ROM (PROM), random access memory (RAM), flash memory, etc., where the instructions direct a computer I/O hub to function in a specified manner. The method 38 can also be implemented as an application specific integrated circuit (ASIC).

The illustrated processing block 40 provides for receiving a plurality of write transactions from a processor and block 42 provides for storing data associated with the write transactions to a buffer of an I/O hub. Blocks 40 and 42 can be repeated as needed until flushing is required. The data is flushed to an I/O device at block 44 according to a protocol between the I/O hub and the processor. As already discussed, the flushing protocol can be implemented in a number of ways.

FIG. 6 shows one approach to a flushing protocol between a processor and an I/O hub at method 38' wherein the protocol includes one or more specific flushing signals to be transferred. Method 38' can therefore be readily substituted for method 38 (FIG. 5) discussed above. In particular, a write transaction is received from a processor at block 40' and it is determined whether a buffer overflow is about to occur at block 41. If storing data associated with the write transaction will cause a buffer overflow, the buffer is flushed at block 52. Otherwise, data associated with the write transaction is stored to the buffer at block 42' and a write completion signal is sent to the processor at block 48, where the write completion signal verifies buffering of the corresponding write transaction. Block 50 provides for determining whether a flush signal has been received from the processor. If not, the I/O hub continues to receive and buffer write combinable writes by returning to block 40'. If a flush signal is detected at block 50, block 51 provides for determining whether a source match has occurred. If so, block 52 provides for flushing the data to the I/O device according to a signaling protocol between the I/O hub and the processor. A flush completion signal is sent to the processor at block 54 after the data is flushed to the I/O device.

Figure 2:
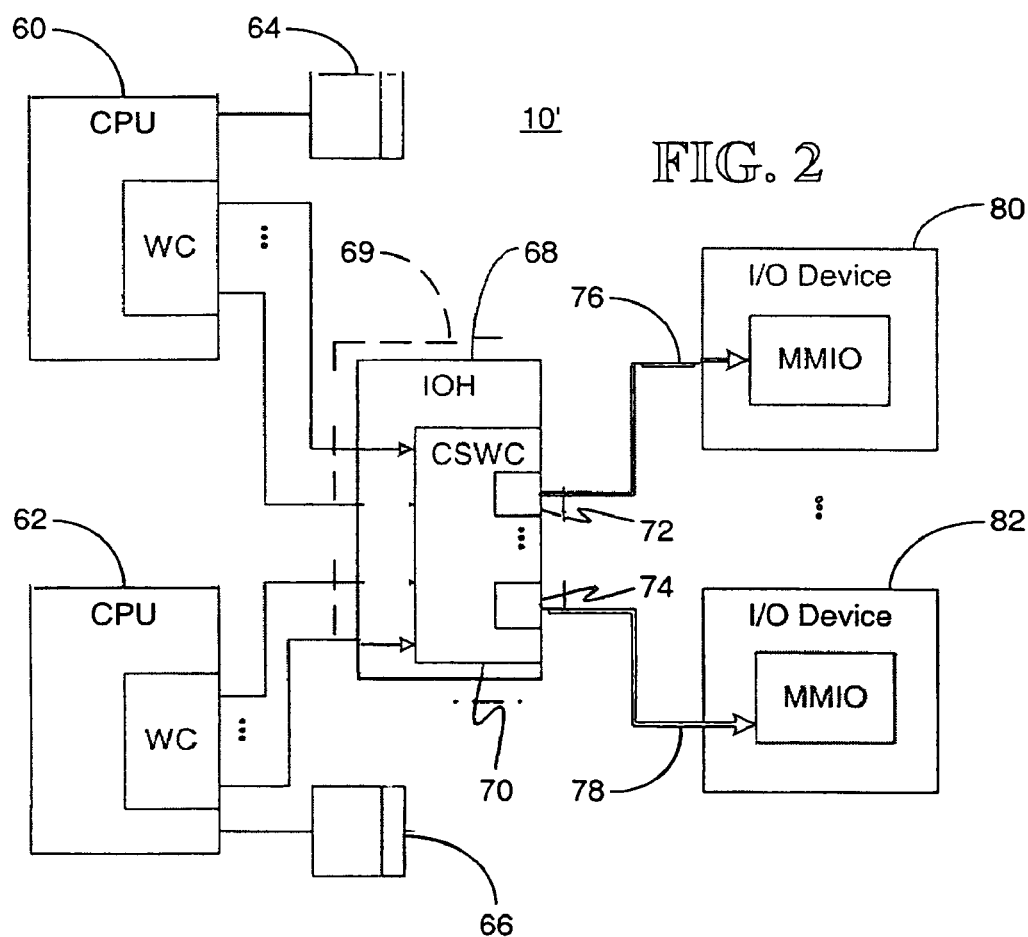
FIG. 2 is a diagram of an example of a computer system according to an alternative embodiment of the invention.

Source matching can provide enhanced performance in multi-processor/multi-buffer environments and will now be described in greater detail with reference to FIG. 2. In particular, a system 10' includes a plurality of processors 60, 62 having respective cache memories 64, 66, and a chipset 69 with an I/O hub 68. The I/O hub 68 has a write combining module 70 and a plurality of buffers 72, 74. Each buffer 72, 74 corresponds to an I/O port and/or I/O interface 76, 78, which connects to I/O devices 80, 82. In one example, the buffer 72 receives writes from the processor 60, whereas the buffer 74 receives writes from the processor 62. In such a case, source matching can be implemented to ensure that a flush signal from the processor 60 does not cause the buffer 74 to be flushed. Similarly, flush signals from the processor 62 can be isolated from the buffer 72. Isolating flushing to the appropriate buffers can increase buffer granularity and enhance system performance.

Source matching can be implemented by tagging the buffers 72, 74 with a source identifier that is associated with one or more write combinable write transactions (i.e., a first source identifier). In one approach, the first source identifier is extracted from the initial write combinable write in a series of write combinable writes. Thus, buffer tagging can be incorporated in to the processing block 42' (FIG. 6) already discussed. When a flushing signal is received, block 51 (FIG. 6) provides for detecting another source identifier that is associated with the flushing signal (i.e., a second source identifier). The second source identifier is compared to the first source identifier and if a match is found the data is flushed from the buffer to the I/O device. Thus, if the buffer 72 has been tagged with the source identifier associated with the processor 60, subsequent flush signals from the processor 62 will be identified as such and therefore ignored by the buffer 72. Similarly, flush signals from the processor 60 can be ignored by the buffer 74.

Figures 7, 8:
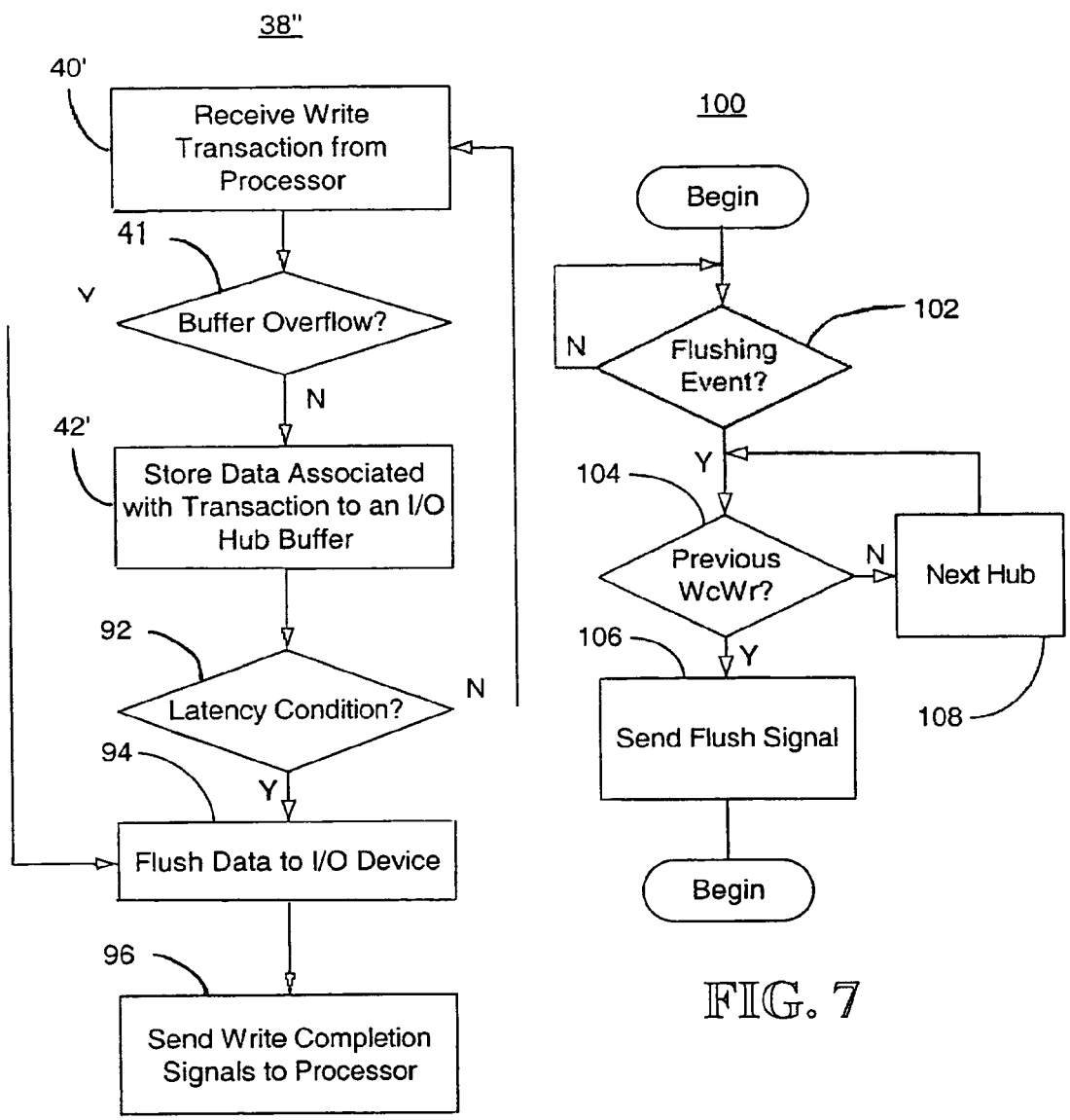
FIG. 7 is a flowchart of an example of a method of generating a flush signal according to one embodiment of the invention.
FIG. 8 is a flowchart of an example of a process of flushing data to an I/O device according to an alternative embodiment of the invention.

FIG. 7 demonstrates one approach to generating a flushing signal at method 100. The illustrated method 100 can be implemented in a processor using any acceptable hardware and/or software programming technique. For example, the method 100 can be embodied as a set of instructions to be stored in a machine readable medium such as read only memory (ROM), programmable ROM (PROM), random access memory (RAM), flash memory, etc., where the instructions direct a computer I/O hub to function in a specified manner. The method 100 can also be implemented as an application specific integrated circuit (ASIC).

Block 102 provides for determining whether a flushing event has occurred. As already discussed, flushing events can include, but are not limited to, the use of ordering fences, encountering implicit locked instructions and encountering interrupts. When a flushing event is encountered, it is determined at block 104 whether a write combine history indicates that one or more combinable write transactions have been issued by the processor. Consulting the write combine history can reduce the negative effects on bandwidth that may result from issuing flush signals for every flushing event that is encountered. The write combine history can be implemented in a number of different ways. For example, in one approach the write combine history tracks combinable write transactions per processor thread. The write combine history could also track combinable write transactions per I/O hub in addition to a per thread basis. If a combinable write has been previously sent, block 106 provides for sending a flush signal to the appropriate I/O hub. If a combinable write has not been sent, the next hub is selected at block 108 and the determination at block 104 is repeated.

It should also be noted that the chipset could include multiple I/O hubs, where the processor is able to issue flush signals to each of the I/O hubs. If the generation of flush signals is rare, broadcasting the flush signals to all of the I/O hubs is not likely to negatively affect performance. Alternatively, the processor could verify that a given I/O hub has previously been issued one or more write combinable write transactions before sending a flush signal to the hub.

Turning now to FIG. 8, an alternative approach to the flushing protocol is shown at block 38'', wherein the protocol relies upon the inherent timing of the processor and the I/O hub. Therefore, block 38'' can be readily substituted for block 38 (FIG. 5) already discussed. In particular, block 40' provides for receiving a write transaction from a processor at block 40'. If a buffer overflow is not detected at block 41, data associated with the write transaction is stored to the buffer at block 42'. Block 92 provides for determining whether a latency condition exists and block 94 provides for flushing the data to the I/O device if the latency condition is present.

The latency condition typically includes a delay in receiving a next combinable write transaction from the processor. The latency condition may also include the interface to the I/O device being in an idle state. Block 96 provides for sending a write completion signal to the processor for each of the write transactions as the data is flushed to the I/O device, where each write completion signal verifies flushing of a corresponding write transaction.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
receiving a plurality of write transactions with a controller hub from a processor, each of the plurality of write transactions being associated with a write combinable attribute to indicate they are a plurality of write combinable write transactions;
buffering data associated with the plurality of write combinable write transactions in a buffer of the controller hub in response to each of the plurality of write transactions being associated with the write combinable attribute to indicate they are the write combinable write transactions; and
transmitting a write completion signal corresponding to each of the plurality of write combinable write transactions with the controller hub to the processor in response to buffering the data associated with each of the plurality of write combinable write transactions;
flushing the data associated with the plurality of write combinable write transactions in the buffer as write combined data in a single transaction to an I/O device in response to receiving a flush signal from the processor after transmitting the write completion signal corresponding to each of the plurality of write combinable write transactions with the controller hub to the processor.

2. The method of claim 1, wherein the processor is to transmit the flush signal in response to receiving a last write completion corresponding to a last write combinable write transaction of the plurality of write combinable write transactions.

3. The method of claim 2, wherein the write completion signal corresponding to each of the plurality of write transactions is transmitted by the controller hub before the processor transmits the flush signal, and wherein the controller hub is further to transmit a flush completion signal to the processor in response to flushing the data to the I/O device.

4. The method of claim 3, wherein the processor is not to issue any further write combinable writes to a same memory region associated with the plurality of write combinable write transactions from when the flush signal is transmitted by the processor to when the processor receives the flush completion signal.

5. The method of claim 1, wherein flushing the data as write combined data to the I/O device in response to receiving the flush signal from the processor further includes: tagging the buffer with a first source identifier associated with one or more of the write combinable write transactions and the processor detecting a second source identifier associated with the flushing signal; comparing the second source identifier to the first source identifier; and flushing the data as write combined data to the I/O device in response to the second source identifier matching the first source identifier.

6. The method of claim 5, further including repeating the comparing for a plurality of buffers, each buffer corresponding to an I/O port.

7. The method of claim 1, wherein the write combined data includes more than one cache line worth of data.

8. The method of claim 1, wherein the receiving includes receiving a plurality of commands instructing the hub to consider each write transaction for write combining, each of the plurality of write transactions including one of the plurality of commands.

9. An apparatus comprising: a hub to be coupled to a processor, the hub including:
receiving logic to receive a first write transaction and a second write transaction from a processor, the first and the second write transactions to reference partial data of a cache line within the processor, wherein the first and second write transactions include a write combinable attribute to indicate a first and a second partial write transactions as write combinable,
combining logic coupled to the receiving logic to combine the partial data of the cache line referenced by the first and second write transactions as write combined data in response to the first and second write transactions including the write combinable attribute to indicate they are write combinable; and
flushing logic coupled to the combining logic to flush the write combined data in a single transaction to an I/O device in response to a flush protocol event.

10. The apparatus of claim 9, wherein the flush protocol event includes special flush signal to be received by the receiving logic from the processor.

11. The apparatus of claim 10, further comprising transmission logic to send a first and a second write completion signals to the processor for the first and the second write transactions, respectively, before the write combined data is flushed to the I/O device, wherein the first and the second write completion signals are to verify successful storage of the partial data referenced by the first and the second write transactions, respectively.

12. The apparatus of claim 11, wherein the transmission logic is also to send a flush completion signal to the processor after the write combined data is flushed to the I/O device.

13. The apparatus of claim 11, further comprising latency logic coupled to the combining logic to detect occurrence of a latency condition, wherein the flush protocol event includes occurrence of the latency condition.

14. The apparatus of claim 13, further comprising transmission logic to send a first and a second write completion signals to the processor for the first and the second write transactions, respectively, as the write combined data is flushed to the I/O device, wherein the first and the second write completion signals are to verify flushing of the first and the second write transactions, respectively.

15. The apparatus of claim 13, wherein the latency condition includes a delay in receiving a next third combinable write transaction from the processor and an interface to the I/O device being in an idle state.

16. The apparatus of claim 11, wherein the combining logic includes a plurality of buffers, each buffer corresponding to an I/O port, and wherein the flushing logic is to flush data from one of the plurality of buffers corresponding to the processor in response to a flush protocol event associated with the processor.

17. An apparatus comprising:
a hub to be coupled to a first device and a second device, the hub including:
a buffer;

receiving logic to receive a first combinable write transaction and a second combinable write transaction from the first device; and a write combining module to store first data associated with the first combinable write transaction in the buffer and send a first write completion signal to the first device in response to storing the first data in the buffer, store second data associated with the second combinable write transaction in the buffer and send a second write completion signal to the first device in response to storing the second data in the buffer, and flush the first data and the second data as combined data in a single transaction to the second device in response to receiving a flush signal from the first device.

18. The apparatus of claim 17, wherein the first device includes a processor and the second device include an input/output (I/O) device.

19. The apparatus of claim 18, wherein the processor is to generate the flush signal in response to a flushing event, the flushing event being selected from a group consisting of use of an ordering fence, encountering an implicit locked instruction, and encountering an interrupt.

20. The apparatus of claim 19, wherein the processor is to generate the flush signal further in response to a write combine history indicating the first combinable write transaction and the second write combinable transaction have been issued by the processor.

21. The apparatus of claim 18, wherein the write combining module is further to send a flush completion signal to the processor in response to the flush of the first data and the second data as combined data to the I/O device.

22. The apparatus of claim 21, wherein the processor is not to issue any further write combinable write transactions to a memory region associated with the first and the second combinable write transactions from when the processor generates the flush signal to when the processor receives the flush completion signal.

23. The apparatus of claim 18, wherein the write combining module is to be implemented in a layered communication protocol including at least a physical layer and a link layer.

24. The apparatus of claim 23, wherein the hub is to be coupled to the processor though a point-to-point interconnect.

25. The apparatus of claim 17, wherein the write combining module is further to flush the first data and the second data as combined data to the second device in response to receiving the flush signal from the first device comprises: determine the flush signal is from the first device based on a first source identifier associated with the first and second combinable write transactions matching a second source identifier associated with the flush signal.

26. An apparatus comprising:

a processor including:

write logic to transmit a plurality of write transactions to be identified as write combinable to a hub;

receiving logic to receive a write completion for each of the plurality of write transactions from the hub;

protocol logic to transmit a flush signal to the hub to initiate a flush of data associated with the plurality of write transactions in a single transaction to an I/O device in response to detecting a flush event and in response to receiving, with the receiving logic, a last write completion for a last write transaction of the plurality of write transactions.

27. The apparatus of claim 26, wherein the flush event is selected from a group consisting of use of an ordering fence, encountering an implicit locked instruction, and encountering an interrupt.

28. The apparatus of claim 26, wherein the protocol logic is further to not allow the write logic to transmit any further write transactions to be identified as write combinable to a memory region associated with the plurality of write transactions from when the protocol logic transmits the flush signal to when the receiving logic receives a flush completion signal from the hub to indicate the flush of the data associated with the plurality of write transactions has been performed.

* * * * *